(12) United States Patent
Klopfer et al.

(10) Patent No.: US 8,307,356 B2
(45) Date of Patent: *Nov. 6, 2012

(54) SAFETY CONTROLLER AND METHOD FOR LOADING A NEW OPERATING PROGRAM ONTO THE SAFETY CONTROLLER

(75) Inventors: Johannes Klopfer, Koengen (DE); Klaus Wohnhaas, Fellbach (DE)

(73) Assignee: Pilz GmbH & Co. KG, Ostfildern (DE)

( * ) Notice: Subject to any disclaimer, the term of this patent is extended or adjusted under 35 U.S.C. 154(b) by 1283 days.

This patent is subject to a terminal disclaimer.

(21) Appl. No.: 11/857,035

(22) Filed: Sep. 18, 2007

(65) Prior Publication Data

US 2008/0010638 A1     Jan. 10, 2008

Related U.S. Application Data

(60) Division of application No. 11/063,392, filed on Feb. 23, 2005, now Pat. No. 7,286,886, which is a continuation of application No. PCT/EP03/09196, filed on Aug. 20, 2003.

(30) Foreign Application Priority Data

Aug. 28, 2002  (DE) .................................. 102 40 584

(51) Int. Cl.
    *G06F 9/44*       (2006.01)
    *G06F 9/445*      (2006.01)
    *G05B 9/02*       (2006.01)
    *G05B 19/42*      (2006.01)
(52) U.S. Cl. ............. 717/173; 717/178; 700/79; 700/87
(58) Field of Classification Search ................... 717/173
    See application file for complete search history.

(56) References Cited

U.S. PATENT DOCUMENTS

| 4,724,521 | A | * | 2/1988 | Carron et al. ................. 717/175 |
| 5,800,473 | A |   | 9/1998 | Faisandier |
| 5,848,064 | A |   | 12/1998 | Cowan |
| 5,920,715 | A | * | 7/1999 | Heckel et al. .................. 712/32 |
| 5,949,997 | A |   | 9/1999 | Smith |
| 5,966,301 | A | * | 10/1999 | Cook et al. ........................ 700/3 |
| 6,351,360 | B1 |   | 2/2002 | Kotowski et al. |
| 6,430,738 | B1 | * | 8/2002 | Gross et al. ................... 717/176 |

(Continued)

FOREIGN PATENT DOCUMENTS

DE     199 53 837 A1     5/2001

(Continued)

*Primary Examiner* — Don Wong
*Assistant Examiner* — Marina Lee
(74) *Attorney, Agent, or Firm* — Harness, Dickey & Pierce, P.L.C.

(57) ABSTRACT

The invention relates to a safety controller and to a method for loading a new operating program onto such a safety controller. The safety controller has an input module for automatically reading process signals, a failsafe signal processing module for automatically processing the process signals, and a failsafe output module which produces control signals as a function of the signal processing module. The signal processing module comprises at least one programmable processor and at least one read only memory. A current operating program for the processor is stored in a non-volatile form in the read only memory. A download device for transferring a new operating program is provided in the safety controller, with the download device enabling or inhibiting the transfer of a new operating program in a failsafe manner as a function of enabling information.

9 Claims, 2 Drawing Sheets

U.S. PATENT DOCUMENTS

| | | |
|---|---|---|
| 6,532,508 B2 * | 3/2003 | Heckel et al. ............... 710/110 |
| 6,615,404 B1 * | 9/2003 | Garfunkel et al. ............ 717/173 |
| 6,629,227 B1 | 9/2003 | Jerding et al. |
| 6,782,313 B1 | 8/2004 | Frech et al. |
| 6,832,343 B2 * | 12/2004 | Rupp et al. ............... 714/47.1 |
| 6,853,292 B1 * | 2/2005 | Kramer et al. ............. 340/3.43 |
| 6,874,075 B2 | 3/2005 | Jerding et al. |
| 6,990,660 B2 * | 1/2006 | Moshir et al. .............. 717/171 |
| 7,051,243 B2 * | 5/2006 | Helgren et al. .............. 714/48 |
| 7,073,059 B2 * | 7/2006 | Worely et al. .............. 713/168 |
| 7,130,701 B1 | 10/2006 | Wischinski ............... 700/65 |
| 7,139,622 B2 * | 11/2006 | Klopfer et al. .............. 700/79 |
| 7,203,723 B2 | 4/2007 | Ogawa ...................... 709/203 |
| 7,286,886 B2 * | 10/2007 | Klopfer et al. .............. 700/79 |
| 7,337,311 B2 * | 2/2008 | Chen et al. ................... 713/2 |
| 7,415,100 B2 * | 8/2008 | Cooper et al. ............ 379/88.01 |
| 8,144,718 B2 * | 3/2012 | Schwenkel et al. .......... 370/408 |
| 2003/0058471 A1 | 3/2003 | Okubo |
| 2003/0188303 A1 * | 10/2003 | Barman et al. ............. 717/170 |
| 2003/0204791 A1 * | 10/2003 | Helgren et al. .............. 714/48 |
| 2004/0010758 A1 | 1/2004 | Sarkar et al. |
| 2004/0107237 A1 | 6/2004 | Kashiwada |
| 2005/0108700 A1 * | 5/2005 | Chen et al. ................. 717/168 |
| 2005/0203645 A1 * | 9/2005 | Klopfer et al. .............. 700/79 |
| 2008/0010638 A1 * | 1/2008 | Klopfer et al. ............. 717/168 |

FOREIGN PATENT DOCUMENTS

| | | |
|---|---|---|
| EP | 0 457 940 B1 | 1/1996 |
| EP | 1 043 640 A2 | 10/2000 |
| EP | 1 193 576 A2 | 4/2002 |
| JP | 7-507893 | 8/1995 |
| JP | 2000-003214 | 1/2000 |
| JP | 2002-207606 | 7/2002 |
| JP | 2002-209180 | 7/2002 |
| WO | WO 93/25948 | 12/1993 |
| WO | WO 9617460 A1 * | 6/1996 |
| WO | 98/44399 | 10/1998 |
| WO | WO 9844399 A2 * | 10/1998 |
| WO | WO 00/68659 | 11/2000 |
| WO | WO 00/79353 A1 | 12/2000 |
| WO | 01/34222 A2 | 5/2001 |
| WO | WO 02/057904 A1 | 7/2002 |

* cited by examiner

SAFETY CONTROLLER AND METHOD FOR LOADING A NEW OPERATING PROGRAM ONTO THE SAFETY CONTROLLER

CROSS-REFERENCE TO RELATED APPLICATIONS

This application is a divisional of U.S. patent application Ser. No. 11/063,392, filed Feb. 23, 2005, now U.S. Pat. No. 7,286,886, which is a continuation of international patent application PCT/EP03/09196, filed Aug. 20, 2003 and designating the U.S., which was not published under PCT Article 21(2) in English, and claims priority of German patent application DE 102 40 584.0, filed Aug. 28, 2002, which are incorporated herein by reference.

BACKGROUND OF THE INVENTION

The present invention relates to a safety controller for failsafe control of safety-critical processes, and more particularly to a safety controller for failsafe disconnection of a machine or machine system. The invention also relates to a method for loading or transferring a new operating program onto such a safety controller.

For the purposes of the present invention, a safety controller is a device or combination of devices connected to each another, which receive process signals from sensors of a machine or machine system and which use these signals to produce output signals by means of logic operations and, if appropriate, by means of further signal or data processing steps. The output signals are supplied as control signals to actuators which carry out specific actions or reactions in the machine or machine system. One preferred field of application for safety controllers is in the field of machine safety, namely monitoring of emergency stop buttons, two-hand controllers, guard doors, light curtains, stationary or rotary condition monitors and the like. Sensors such as these are used, for example, in order to safeguard a machine which otherwise might cause a hazard to the operator. When the guard door is opened or when the emergency stop button is operated, a process signal is produced which is supplied as an input signal to the safety controller. In response to the input signal, the safety controller switches off the dangerous part of the machine in a failsafe manner, by means of a connected actuator.

A characteristic feature of a safety controller in contrast to a "normal" controller is that the safety controller must always ensure that the process (such as the dangerous machine) being controlled is in a safe state. This requirement even applies when a malfunction occurs within the safety controller or in a device which is connected to it. Safety controllers are therefore subject to extremely stringent requirements for their own failsafety, which results in considerable additional effort during development and manufacture. Generally, safety controllers require special licensing from responsible supervisory authorities before they are used, such as, in Germany for example, from the professional societies dealing with work safety or from a technical supervisory association. The safety controller must comply with specific safety standards which are defined, such as defined in European Standard EN 954-1. The present invention takes account of these special requirements. The expression "safety controller" therefore in this case relates only to a device or a combination of devices which are approved for the control of machines, machine systems and the like in accordance with at least Category 3 of the above-mentioned European Standard.

A programmable safety controller offers the user the capability of individually defining, in accordance with his requirements, the logical operations on the input signals with the aid of software, specifically the so-called user program. A programmable safety controller thus replaces the previously normal wiring to the individual sensors with the aid of logic switching elements. In order to make it possible to carry out this function, a programmable safety controller has an operating program which is separate from the user program and which defines the basic functional scope of the safety controller. In particular, the operating program contains program code by means of which the hardware components of the safety controller are addressed directly and are thus "brought to life".

Furthermore, safety control rules are also generally implemented in the operating program, which the user program calls up as prepared functional modules and which the user can configure by means of input and output signals at any given time. For example, prepared functional modules for failsafe evaluation of a two-channel emergency-stop button or of a two-channel guard door might be contained in the operating program. In the user program, the user can now only define how the provided modules, i.e. the emergency stop button and the guard door, should be logically linked to one another.

For safety reasons, the user has no access to the operating program, i.e. he can neither replace nor modify the operating program. In the art, the operating program is often referred to as firmware.

WO 98/44399 discloses a method for programming a safety controller in which the safety control rules are stored in the safety controller in the form of functional modules. By means of his user program, the user can select the functional modules, he can configure them and he can logically link them to one another. This is done by means of a programmer, with which the commands for selection, configuration and logic operations on the functional modules are transferred to the safety controller. As explained above, however, it is impossible for the user to access the safety control rules implemented in the functional modules, i.e. he can neither replace them nor modify them.

The inhibited access to the operating program corresponds to the well accepted practice for safety controllers, since the operating program in conjunction with the hardware of the safety controller are subject to licensing by the responsible supervisory authorities. If it were possible for the user to access the combination of hardware and operating program, the manufacturer of the safety controller would not be able to guarantee the failsafety in accordance with the verified certification, according to the general opinion.

However, the common practice has the disadvantage that a functional change in the operating program of the safety controller can be carried out only by the manufacturer of the safety controller himself. If a functional change or an update is desired in the operating program, the user must either send the safety controller to the manufacturer or must request specialist or approved servicing personnel from the manufacturer. This is inconvenient and expensive and, furthermore, may also be disadvantageous in terms of shutdown times for the machine system in which the safety controller is used.

When no safety factors are involved, such as in the case of commercially available personal computers, it is common practice that a user can carry out software updates on his own responsibility by obtaining new software from the manufacturer and loading it onto the personal computer, possibly after instruction. This also applies to so-called operating systems which represent an operating program in the sense of the present invention. According to well established opinion, however, such a procedure is not feasible for safety applications because this would result in the manufacturer of the safety controller losing sole control over the combination of hardware and operating program. In consequence, unchecked combinations of hardware and operating programs would be possible, which would represent a safety risk.

SUMMARY OF THE INVENTION

It is an object of the present invention to provide a safety controller which allows more flexible and more cost-effective adaptation to customer requirements.

It is another object of the invention to provide a method for loading a new operating program onto a safety controller.

According to one aspect of the invention, these and other objects are achieved by a safety controller for failsafe control of a safety-critical process, having an input module for automatically reading process signals, having a failsafe signal processing module for automatically processing the process signals, and having a failsafe output module for producing control signals in response to the signal processing module, with the signal processing module comprising at least one programmable processor and at least a first read only memory in which a current operating program for the processor is stored in a non-volatile form, and having a download device for transferring a new operating program into the first read only memory, with the download device enabling or inhibiting the transfer of the new operating program in a failsafe manner as a function of enabling information.

According to another aspect of the invention, there is provided a method for loading a new operating program into a safety controller for failsafe control of a safety-critical process, the method comprising the steps of:

providing a safety controller having a current operating program,
providing a new operating program,
providing enabling information,
transferring the new operating program into a read only memory in the safety controller as a function of the enabling information.

For the first time in the field of machine safety, the new safety controller and the new method enable a user to load or transfer a new operating program, such as new firmware, to an existing safety controller by himself. The present invention thus departs from the fundamental principle that has been followed until now that actions which relate to safety control rules may be carried out only by the manufacturer who bears responsibility to the supervisory authorities.

The departure from the previous practice is possible owing to the surprising discovery that the manufacturer's control of the safety controller can still be maintained, without any gaps, by means of enabling information. The selection and definition of the enabling information are still controlled by the manufacturer. Since loading of the new operating program is inhibited in a failsafe manner, and thus "automatically" or "by the machine", as a function of the enabling information, the manufacturer of the safety controller can restrict the number of possible combinations of hardware and operating program at the users end. It is sufficient to design the download device such that it allows the new operating program to be transferred only when it identifies, on the basis of the required enabling information, that the manufacturer has enabled the transfer onto the existing hardware platform. The check of the enabling information which, for example, contains a list of permissible hardware platforms, can be carried out in a failsafe manner by programming or circuitry measures which are known per se and are normally used in the field of machine safety, in particular by means of two-channel and preferably diverse checking of the enabling information and/or two-channel and preferably diverse inhibiting of the transfer.

Owing to the capability for the user to update the software of the operating program, the new safety controller is considerably more flexible in terms of logistic supervision. Production and servicing costs by the manufacturer can be reduced. On the other hand, shutdown times for a machine system for modification of the safety controller on the operating program level can be reduced since there is no need to wait for a servicing technician from the manufacturer. Furthermore, the user is provided with a wider range of use for an existing safety controller since he can upgrade his safety controller by loading a new operating program with a new functional scope. However, these advantages are not linked to any adverse safety effects, since the user, as before, has no access to the internal safety control rules.

In a refinement of the invention, the enabling information is at least partially integrated into the new operating program in a machine-legible form.

This refinement is a very simple and convenient option for the user for evaluating the enabling information in a failsafe manner and for carrying out or inhibiting the transfer of the new operating program in a failsafe manner. Furthermore, manipulations can be suppressed even better by means of an at least partially integrated enabling function, which leads to improved safety.

In a further refinement, the enabling information comprises a first and a second item of sequential version information, with the first sequential version information item being associated with the current operating program, and the second sequential version information item being associated with the new operating program.

An item of a sequential version information, i.e. an item of a version information which can be put into a series in only one specific place, is a particularly simple way to implement failsafe enabling or inhibiting. This is because, in principle, the manufacturer delivers safety controllers with an operating program loaded on them. The combination of the hardware platform and the current operating program is thus subject, as before, to complete control by the manufacturer within his own organization. A sequential version information item then makes it easily possible for the manufacturer to ensure that a user can load only a more recent operating program, that is to say an operating program with a higher sequential version information item. It is thus impossible for the delivered safety controller to be provided with an "older" operating program by the user, under any circumstances. The majority of the unchecked and thus unacceptable combinations of hardware platform and operating program are thus effectively precluded in a simple manner.

For the manufacturer, it is sufficient that he can verify with the supervisory authorities that a new version of the operating program having a higher version information item can appropriately run in a failsafe manner on the previously used hardware platforms. The effort to do this can be kept at a low level since a new version of an operating program is generally built on previous versions and accordingly includes only a restricted range of modifications.

The theoretically feasible possibility of a user loading an older operating program, which has not been checked in this combination, onto a new safety controller is precluded by the failsafe checking of the sequential version information item.

In a further refinement, the download device contains a comparator for comparing the first and second version information items, and comprises an enabling device inhibiting the loading of the new operating program in a failsafe manner as a function of the comparator when the sequential second version information item is lower than the sequential first version information item.

This refinement is a particularly advantageous way to evaluate the sequential version information items automatically and by machine in order to enable or inhibit the transfer. In this case, it is self-evident that the comparator and the enabling device may equally well be in the form of hardware modules or in the form of software, i.e. they can be implemented within the current operating program.

In a further refinement, the enabling device enables the loading of the new operating program only when the sequential second version information item is higher than the sequential first version information item.

In other words, the download of the new operating program is also inhibited when the sequential second version information item is the same as the sequential first version information item.

In this refinement, the renewed loading of an identical operating program is also inhibited in addition to the previously explained approach. There might be a stimulus to do this, for example, if the user of the safety controller encounters malfunctions which lead him to suppose that they can be rectified by renewed loading of the existing operating program. However, such "self-help" is frequently deceptive. For safety reasons, it is therefore advantageous if a user can only load an operating program with a higher version information item on his safety controller on his own.

In a further refinement, the first and the second version information items are stored in a failsafe manner in the respective operating program.

Failsafe protection of the version information is achieved in particular by redundant storage and/or a signature formation process, which is known per se, for example in the form of a CRC checksum (cyclic redundancy check). In this refinement, a new operating program can be loaded even more reliably since undesirable loading of a new operating program is itself prevented in the event of a fault in or any manipulation of the version information. This further reinforces the manufacturer's control of the safety controller.

In a further refinement, at least the new operating program comprises program code which implements safety control rules in the safety controller when the new operating program is run in the safety controller.

This measure allows the entire functional scope of the safety controller to be modified in a particularly advantageous manner without the manufacturer of the safety controller losing control. The advantages of the invention are clearly evident in this refinement. In this case, the user has the capability to modify the safety control rules by loading the new operating program. However, he is restricted to replacement of the "total package", which is controlled by the manufacturer, of all the implemented safety control rules. He cannot himself modify or manipulate the safety control rules, which would involve a safety risk.

In a further refinement, a second read only memory is provided in which a first item of hardware information is stored which is characteristic at least of the signal processing module. Furthermore, the new operating program comprises a second item of hardware information which is characteristic of the minimum required hardware configuration, and the enabling device enables or inhibits the loading of the new operating program as a function of a comparison of the first and of the second hardware information items. In other words, the enabling device inhibits the storage as a function of a comparison of the first and of the second hardware information items.

This refinement of the invention also allows the manufacturer of the safety controller to ensure that a new operating program may be operated only on a hardware platform which satisfies the minimum preconditions tested by him. The manufacturer of the safety controller can thus further restrict the range of combinations of hardware platforms and operating programs at the user end. From the manufacturer's point of view, this makes it possible to reduce the effort for verification of those combinations of hardware platforms and operating programs which are permissible without any faults. From the user's point of view, this further reduces the risk of a safety-critical combination of hardware and an operating program.

In a further refinement, the first and the second hardware information items contain items of a sequential version information.

A sequential version information item, as already explained, allows insertion in only one place of a series or sequence. The permissibility of the combination of the hardware platform and operating program at the user's premises can thus be checked particularly easily and reliably.

In a further refinement, the first and the second hardware information items each contain type information.

This allows the check as to whether a permissible combination of hardware platform and operating program exists to be carried out even more simply and reliably. Type information makes it possible to distinguish between different series at hardware platforms, so that the loading of an operating program not appropriate to this particular type is prevented irrespective of the version information. Furthermore, a duplicated checking capability, which offers additional safety, is obtained in conjunction with sequential version information.

It is self-evident that the features which have been mentioned above and those which are still to be explained in the following text can be used not only in the respectively stated combination but also in other combinations or on their own without departing from the scope of the present invention.

BRIEF DESCRIPTION OF THE DRAWING

Exemplary embodiments of the invention will be explained in more detail in the following description and are illustrated in the drawing, in which.

DESCRIPTION OF PREFERRED EMBODIMENTS

Figure 1:
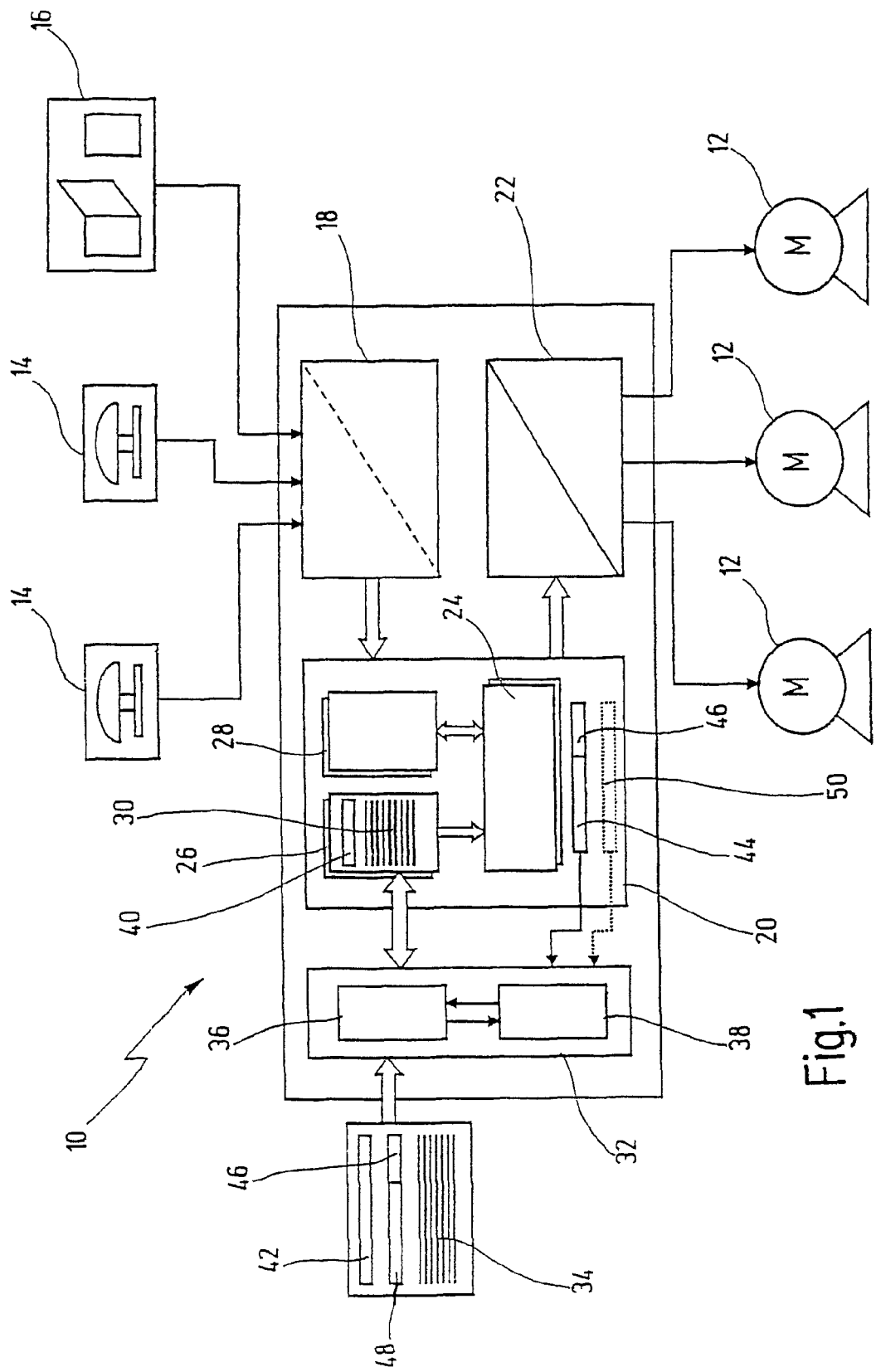
FIG. 1 shows a schematic illustration of a safety controller according to the invention.

In FIG. 1, a safety controller according to the invention is designated by reference number 10.

In this case, according to one preferred embodiment of the invention, the safety controller 10 is used for safe disconnection of a machine system, in particular of a machine system in an industrial production environment. The machine system is illustrated in this case by way of example by three electrical drives 12 which can be switched off individually or jointly by the safety controller 10. In this application example, the safety controller 10 evaluates two emergency stop switches 14 and a guard door 16 as input signals. The emergency stop switches 14 and the guard door 16 are arranged in a manner known per se in the area of the machine system in order to ensure that it is protected with regard to the safety at work of the operator.

The safety controller 10 of the present embodiment is a proprietary device solely responsible for the protection of the machine system, i.e. the deliberate disconnection of the drives 12 when a corresponding disconnection signal is present from the emergency stop switches 14 or from the guard door 16. In this case, the operational control of the machine, i.e. for example the acceleration and braking of the drives 12 during the working procedure, is not the task of the safety controller 10. An autonomous operational controller, which is known per se, is provided for this purpose, but is not illustrated here for clarity reasons. Alternatively, however, the safety controller 10 may in other exemplary embodiments also provide the operational control for the machine system as well. It is self-evident that the safety controller 10 would in this case be more complex and would receive and emit further machine-typical control signals in addition to the input and output signals that are shown.

It is also self-evident that any other desired signal transmitters may be connected to the input of the safety controller 10 in addition to the signal transmitters shown here for the input signals, i.e. the emergency stop switches 14 and the guard door 16, such as two-hand buttons, stationary state monitors, light barriers or position switches. The failsafe evaluation of these signal transmitters is carried out in the safety controller 10 in a manner known per se by means of the operating program and the user program.

Other electrically operated loads can likewise be connected to the output of the safety controller 10, which must be switched off in a failsafe manner as a function of the signals at the input of the safety controller 10.

Finally, it should be mentioned that the safety controller 10 can be programmed by the user in a manner known per se with a user program. By way of example, reference should be made to WO 98/44399 which has already been cited in the introduction. However, the advantages of the invention also apply to those safety controllers which cannot be programmed with a user program by the user, as long as an operating program in the sense of the explanatory notes above is present. Safety controllers such as these are marketed, by way of example, by the assignee of the present invention in the product range PNOZelog™, in which case it has not until now been possible for the user of these devices to replace the operating program.

In order to receive process variables from the signal transmitters, i.e. the emergency stop switches 14 and the guard door 16, the safety controller 10 has an input module 18. The input module 18 is generally based on a two-channel redundant design because of the failsafety that is required, this being represented by the dashed line in FIG. 1. However, in individual cases, it may be sufficient for the input module 18 or at least parts of it to be designed with one channel. Furthermore, the input module in the block diagram shown in FIG. 1 is illustrated as a dedicated functional block, for reasons of clarity. However, it may be partially in the form of software and is then embedded in an appropriate form in the operating program.

Number 20 denotes a signal processing module in the safety controller 10. This links the process signals received by the input module 18, in a manner known per se, and uses them to produce control signals which are emitted via an output module 22. The output module 22 frequently contains relays, contactors or else electronic switches, by means of which the electrical supply to the drives, or more generally to the machine system, is switched off in a failsafe manner. The failsafety is once again symbolized by a diagonal line, which indicates an appropriately redundant design of the output module 20. The signal flow from the input module 18 via the signal processing module 20 to the output module 22 is indicated by appropriate block arrows in FIG. 1.

The signal processing module 20 contains at least one programmable processor 24 as well as a read only memory 26 and a main memory 28. The operating program 30 for the processor 24 is stored in a non-volatile form in the read only memory 26, in a manner which is known per se. This is a sum of program instructions in machine-legible form, which allows the basic functionality of the safety controller 10. In particular, the operating program 30 in this exemplary embodiment contains those program instructions by means of which the processor 24 can read and emit signals. Effectively, these program instructions "bring to life" the hardware of the safety controller 10.

Furthermore, the operating program 30 in this case contains a prepared set of safety control rules, by means of which, for example, the failsafe evaluation of a two-channel emergency stop switch is provided. Failsafe evaluation algorithms are likewise provided for all of the other permissible signal transmitters and for all of the permissible actuators on the output side of the safety controller 10.

If the safety controller 10 is a proprietary device, the operating program 30 also includes the association between the safety control rules and the input and output connections. In this case, the user has no influence, or at best only a very limited influence, on the functional scope. As mentioned, the safety controller 10 may, however, alternatively be produced in such a way that the user can select the safety control rules, and can configure them, by means of a user program which he creates himself.

The main memory 28 is used for temporary storage of intermediate variables and, possibly, for holding the user program, which is placed on the operating program 30.

The signal process module 20 in the safety controller 10 is designed entirely to be intrinsically failsafe as can be seen, by way of example, from a redundant implementation with mutual tests and checks. The processor 24, the read only memory 26 and the main memory 28 are in this case indicated in the illustration as being duplicated.

The reference number 32 in the block diagram denotes a download device for loading a new operating program 34. "Loading" in this case means that the new operating program 34 is stored in the read only memory 26 in such a way that it together with and/or alternatively to the first operating program 30 determines the functional scope of the safety controller 10. The process of loading the new operating program 34 may, in particular, include complete replacement of the existing operating program 30. It is thus, inter alia, possible to replace the previously provided safety control rules by modified safety control rules.

Corresponding to the invention, the download device 32 in this case contains a comparator 36 as well as an enabling device 38. Furthermore, a sequential version information item is provided both in the existing operating program 30 and in the new operating program 34, and is annotated respectively with the reference numbers 40 and 42 in FIG. 1. The comparator 36 reads the version information item 40 for the existing operating program 30 and the version information item 42 for the new operating program 34, and compares them with one another. Depending on the result of this comparison, the enabling device 38 inhibits or enables the capability to load the new operating program 34. Specifically, the download device 32 allows the loading of the new operating program 34 only when the version information for the new operating program 34 is higher than the version information for the existing operating program 30. In other words, a new operating program 34 can be loaded in the safety controller 10 only when it is more recent than the existing operating program 30, and this is determined by comparison of the version information items.

It is self-evident that the illustration in FIG. 1 with the comparator 36 and the enabling device 38 was chosen primarily for illustrative reasons. In a practical implementation, the comparison of the version information items and the enabling or inhibiting of the loading are carried out by program means, that is to say by appropriate program instructions which are stored in the read only memory 26 as part of the existing operating program 30, and are processed by the processor 24. The hardware for the download device 32 furthermore includes an interface which is known per se, such as an RS232 interface, via which the new operating program 34 can be read in, if appropriately enabled.

In accordance with one preferred exemplary embodiment of the invention, the version information items 40 and 42 for the operating programs 30 and 34 are embedded in the operating programs with multiple redundancy, and/or are protected by error protection measures, such as a CRC checksum or some other signature formation process. The enabling device 38 allows the new operating program 34 to be loaded only when a failsafe comparison of the two version information items 40, 42 indicates without any doubt that the version information for the new operating program 34 is higher than the version information for the existing operating program 30.

On the basis of one preferred exemplary embodiment, a hardware information item 44 which is characteristic at least of the signal processing module 20 is also stored in the safety controller 10. In other words, the hardware information 44 provides information about the development standard of the hardware platform for the safety controller 10. According to one particularly preferred exemplary embodiment, the hardware information also includes type information 46, by means of which it is possible to identify different hardware platforms more accurately. Furthermore, the new operating program 34 contains a second hardware information item 48, which can be used to identify at least those hardware preconditions which are required. The hardware information items 44, 48 are preferably once again sequential version information items which allow the existing hardware platform and the minimum required preconditions to be inserted in only one position into a development sequence.

In the preferred exemplary embodiment, the check to determine whether the loading of the new operating program 34 will or will not be enabled also takes account of the hardware information 44, 46, 48. In particular, the loading of the new operating program 34 is enabled only when the minimum requirements (which are coded in the operating program 34) for the hardware platform for the safety controller 10 undoubtedly exist on the basis of the stored hardware information 44, 46.

According to a further preferred exemplary embodiment, a further version information item 50 is stored in a non-volatile manner in the safety controller 10 as well, defining the minimum permissible version for a new operating program 34. In this exemplary embodiment, the process of enabling the loading of a new operating program 34 is thus additionally made dependent on the version information item 42 being higher than the defined minimum version information item 50. This further comparison criterion makes the loading of the new operating program 34 dependent on a further check. However, this check may also be omitted if the manufacturer of the safety controller 10 guarantees that the safety controller 10 will always only ever be delivered with one operating program 30 by one version information item 40 being included. A minimum requirement for the new operating program 34 is then ensured by the fact that the new operating program 34 can be loaded only if its version information item is higher than the existing one.

Figure 2:
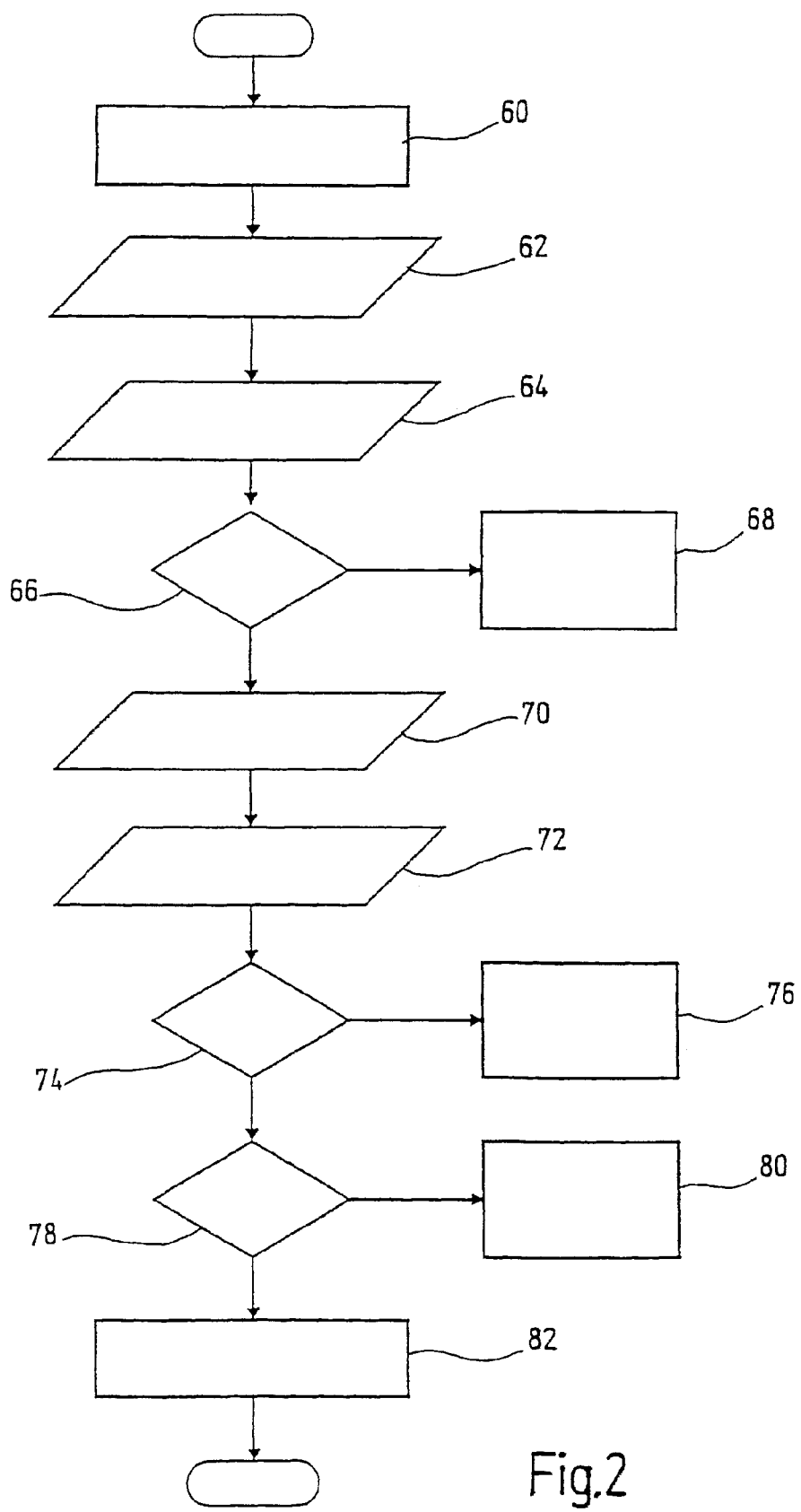
FIG. 2 shows a flowchart in order to explain the method according to the invention.

FIG. 2 uses a flowchart to schematically illustrate how the new operating program 34 can be recorded. As can easily be seen, the corresponding method may very well be implemented in the form of suitable program code for the processor 24.

First of all, a download mode is activated in step 60. In order to prevent incorrect control actions and inadvertent activation, this can advantageously be achieved by the operation of a key-operated switch (not illustrated here), which is provided additionally for this purpose, on the safety controller 10. However, it is also possible to activate the download mode in the form of a program, by entering a password or the like.

The current version information item 40 for the existing operating program 30 is then read in step 62. The version information item 42 for the new operating program 34 is then read in step 64. The two version information items 40, 42 are then compared in step 66. If the version information item 40 for the existing operating program 30 is greater or higher than the version information item 42 for the new operating program 34, the method is terminated in step 68, with the download mode preferably being ended. This reliably prevents the new operating program 34 from being recorded.

If the comparison of the two version information items 40, 43 shows that the new operating program 34 may permissibly be added to or may replace the existing operating program 30, the hardware information 44, 46 for the safety controller 10 is read in step 70. The hardware information 48 is then read in step 72, defining the minimum hardware preconditions for the running capability and permissibility of the new operating program 34. In the preferred exemplary embodiment described here, a type comparison is first of all carried out in the step 74, that is to say a check is carried out to determine whether the operating program 34 is permissible for operation on the safety controller 10 on the basis of the type information. If this not the case, the download mode is finally terminated once again in step 76.

If, on the other hand, the type comparison is likewise positive, a further criterion is checked in the step 78 to determine whether the hardware information 44 for the safety controller 10 is greater than or at least equal to the minimum hardware information 48 which is contained in the operating program 34. If this comparison shows that the safety controller 10 does not comply with the minimum hardware preconditions, the download mode is terminated once again, in step 80.

If, on the other hand, the check of the hardware preconditions on the basis of the hardware information is also positive, the operating program 34 is loaded, in accordance with step 82. In other words, the operating program 34 is then stored in the read only memory 26. Once the storage process has been completed, the new operating program 34 is available instead of or in addition to the existing operating program 30 for operation of the safety controller 10.

The new operating program 34 may be transferred to the safety controller 10 in various ways. As has already been mentioned above, the operating program 34 can be transferred via a serial interface to the safety controller 10 once this has been enabled. It is likewise possible for the transfer to take place via a fieldbus or a exchangeable memory medium. In principle, it is even possible to transfer the new operating program 34 via the Internet.

In order to further improve the failsafety, it is also advantageous for the operating program 34 and, in particular, the version information items 42 and 48 to protect against manipulation and corruption by means of an encryption algorithm which is known per se. An appropriate decryption program (which is not illustrated here) is then provided in the safety controller 10.

In the preferred exemplary embodiments which have been described so far, the version information items contain, for example, numerical and/or letter combinations which allow insertion in only one place in a sequence. As an alternative to this, however, it is also possible for the version information items not to be provided in "complete form", but in the form of an algorithm which produces a unique result and thus only then allows the final determination of the sequential version information. This is also sequential version information for the purposes of the present invention.

What is claimed is:

1. A method of loading a new or updated operating program onto a safety controller that includes a signal processing module having a memory, a programmable processor and a current operating program for implementing safety control rules that is stored in said memory as firmware, comprising the steps of:

storing in said memory first hardware information data identifying at least the signal processing module of the safety controller, providing the new or updated operating program with second hardware information data identifying a minimum required safety controller hardware for said new or updated operating program, and controlling the transfer of said new or updated operating program into said memory as new or updated firmware based upon a comparison of said first and second hardware information data, and failsafely inhibiting the transfer step if said first and second hardware information data does not correspond in a predetermined manner.

2. The method of claim 1, further including the step of transferring the new or updated operating program into said memory as a function of enabling information including said first and second hardware information data.

3. The method of claim 2, wherein the step of failsafely inhibiting the transfer step is performed by means of a redundant two-channel checking of said enabling information.

4. A method for loading a new operating program into a safety controller for failsafe control of a safety-critical process, the method comprising the steps of:

providing a safety controller having defined processor hardware and a read-only memory having stored therein a current operating program for implementing safety control rules, providing a new operating program, providing enabling information identifying a minimum required safety controller hardware for the new operating program, transferring the new operating program into the read-only memory in the safety controller only if the defined processor hardware complies with said minimum required safety controller hardware, and failsafely inhibiting the transferring step if the defined processor hardware does not comply with said minimum required safety controller hardware.

5. The method of claim 4, wherein the transferring step includes the step of checking the defined processor hardware against said minimum required safety controller hardware in a failsafe manner.

6. The method of claim 5, wherein said checking step is performed by means of a redundant two-channel process.

7. The method of claim 4, wherein the step of failsafely inhibiting the transfer step is performed by means of a redundant two-channel checking of said enabling information.

8. A non-transitory computer readable storage medium containing an operating program for a safety controller having a signal processing module, the operating program comprising program code firmware for implementing safety control rules in the safety controller when the operating program is run in the signal processing module, and comprising integrated enabling information identifying a minimum required safety controller hardware for the operating program that is adapted to failsafely inhibit transfer of the operating program to a safety controller having hardware different from said minimum required safety controller hardware.

9. The non-transitory computer readable storage medium of claim 8, wherein the enabling information is stored in the operating program in a failsafe manner.

* * * * *